United States Patent [19]

Ruiz

[11] Patent Number: 4,719,794

[45] Date of Patent: Jan. 19, 1988

[54] SYSTEM AND METHOD OF ENGINE CALIBRATION

[75] Inventor: Victor Ruiz, Canton, Mich.

[73] Assignee: General Motors Corporation, Detroit, Mich.

[21] Appl. No.: 858,019

[22] Filed: May 1, 1986

[51] Int. Cl.⁴ .............................................. G01M 19/00

[52] U.S. Cl. ................................ 73/118.1; 364/431.05

[58] Field of Search .................. 73/118.1; 364/431.05, 364/431.06

[56] References Cited

U.S. PATENT DOCUMENTS

| | | | |
|---|---|---|---|
| 4,164,142 | 8/1979 | Blanke | 73/118.1 |
| 4,170,040 | 10/1979 | Leblanc et al. | 364/431.05 X |
| 4,307,450 | 12/1981 | Carp et al. | 364/431.05 |
| 4,309,971 | 1/1982 | Chiesa et al. | 364/431.05 X |
| 4,437,340 | 3/1984 | Csere et al. | 73/118.2 |

OTHER PUBLICATIONS

"OPEL Carburetion and Tune Up"; OPEL Training Manual, Oct. 1970, pp. 19 and 41, by OPEL.

*Primary Examiner*—Tom Noland
*Attorney, Agent, or Firm*—Howard N. Conkey

[57] ABSTRACT

The open loop calibration of the fuel delivery system of an internal combustion engine is recalibrated based on the response of the engine idle speed as the air/fuel ratio of the air and fuel mixture supplied to the engine is varied. When the engine is at idle, the air/fuel ratio of the mixture supplied to the engine is decreased until a peak engine idle speed is detected. Thereafter, the air/fuel ratio of the mixture is increased until the engine speed decreases from the detected peak value by an amount corresponding to the desired value of a controlled parameter such as the amount of CO in the exhaust gases.

1 Claim, 6 Drawing Figures

SYSTEM AND METHOD OF ENGINE CALIBRATION

BACKGROUND OF THE INVENTION

This invention relates to a system and method of providing an open loop calibration of the air-fuel delivery system of an internal combustion engine.

Fuel delivery systems of internal combustion engines are generally calibrated so as to establish a fuel delivery rate in response to engine operating parameters, such as mass air flow into the engine, that results in a desired value of a controlled parameter. This controlled parameter may be a particular air/fuel ratio such as the stoichiometric ratio or may be the emission level of one of the combustion by-products present in the exhaust gases discharged from the engine such as carbon monoxide (CO).

The fuel delivery system calibration for establishing the controlled parameter to the desired value is an open loop calibration that may or may not be subsequently adjusted via a closed loop controller. However, due to manufacturing tolerances and changes in engine components over time, the initial open loop calibration may not always produce the desired value of the controlled parameter.

SUMMARY OF THE INVENTION

When the air/fuel ratio of the mixture supplied to an engine is varied while the engine is at idle, the engine idle speed varies in a predictable manner. For example, there is an air/fuel ratio at which the idle speed is at a peak value. When the air/fuel ratio is increased or decreased from that ratio, the engine idle speed decreases. In accord with the present invention, the open loop calibration of the fuel delivery system of an internal combustion engine is recalibrated based on the response of the engine idle speed as the air/fuel ratio of the air and fuel mixture supplied to the engine is varied. Specifically, this invention recognizes that for a particular engine, as the air/fuel ratio is increased from the ratio producing the maximum engine idle speed, there is a substantially constant relationship between the decrease in the engine idle speed from the maximum engine idle speed and certain engine parameters such as air/fuel ratio or the amount of CO present in the exhaust gases.

Through engine testing, the specific relationship between the drop in idle speed and the controlled parameter is determined. Thereafter, the engine fuel system open loop calibration may be periodically recalibrated to establish the desired parameter value based on the determined relationship.

In general, the recalibration process is as follows: With the engine at idle, the air/fuel ratio of the mixture supplied to the internal combustion engine is decreased from a value such as the stoichiometric ratio until a peak engine idle speed is detected. Thereafter, the air/fuel ratio of the mixture is increased until the engine speed decreases from the detected peak value by an amount (determined from prior engine testing) corresponding to the desired value of the controlled parameter. For example, if the controlled parameter is the amount of CO in the exhaust gases, the air/fuel ratio is increased until the engine speed decreases by an amount that corresponds to the value previously determined via engine testing to produce the desired CO content in the exhaust gases. The air/fuel ratio resulting in the decreased engine speed corresponding to the desired CO content in the exhaust gases comprises the recalibrated open loop system calibration producing the desired controlled parameter.

BRIEF DESCRIPTION OF THE DRAWING

The invention may be best understood by reference to the following description of a preferred embodiment and the drawings in which.

DESCRIPTION OF A PREFERRED EMBODIMENT

Figure 1:
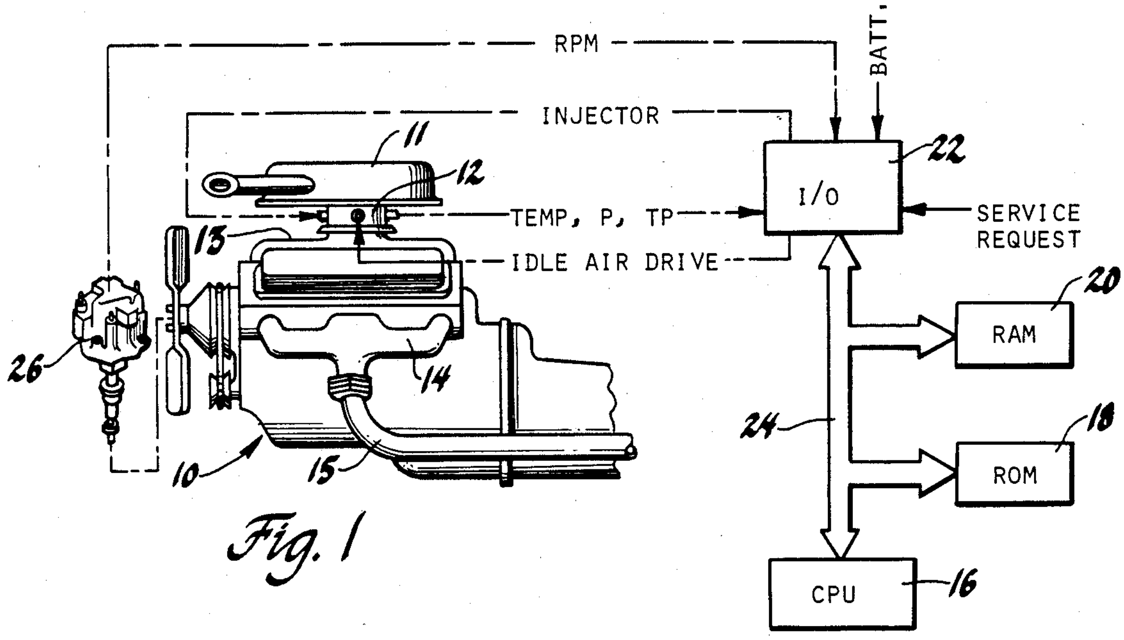
FIG. 1 illustrates a schematic and block diagram of an engine and a system for controlling the air and fuel mixture supplied thereto.

Referring to FIG. 1, an internal combustion engine 10 has an air intake apparatus including an air cleaner 11, a throttle body 12, an intake manifold 13 and an exhaust apparatus including an exhaust manifold 14 and an exhaust pipe 15. The throttle body 12 defines a main air induction passage including therein an operator controlled throttle valve and an idle air bypass passage which bypasses the throttle valve.

The idle air bypass passage includes an idle air control valve positioned such as by a stepper motor to control the amount of air bypassed around the main throttle for idle speed control. The idle air bypass passage, the control valve therein and the motor for positioning the control valve are conventional and are not illustrated in detail.

A fuel injector apparatus including an injector is positioned in the throttle passage of the throttle body 12 to inject a controlled quantity of liquid fuel into the main air induction passage therein. The amount of fuel injected is based on the total air flow into the internal combustion engine 10 and a desired air/fuel ratio. The air and fuel mixture drawn into the engine 10 undergoes combustion and the by-products of the combustion are discharged into the exhaust manifold and thereafter to the atmosphere through the exhaust pipe 15.

The preferred embodiment of this invention is described with respect to the control of the amount of carbon monoxide (CO) in the exhaust gases discharged to the atmosphere through the exhaust pipe 15 at least during a predetermined operating point or range of the engine 10. In this respect, the ratio of the mixture of the air and fuel supplied to the engine 10 is set to a value to achieve a desired level of CO in the exhaust gases while maintaining engine drivability. As will be described, the ratio of the air and fuel mixture supplied to the engine required to produce the desired CO amount is periodically determined such as at vehicle or engine service intervals.

The air and fuel mixture supplied to the engine 10 and the calibration of the ratio thereof for obtaining the desired level of CO in the exhaust gases is established by means of a digital computer having a central processing unit (CPU) 16, a read-only memory (ROM) 18, a random access memory (RAM) 20 and an input/output device (I/O) 22. These devices are standard and are interconnected in the normal manner with buses and other lines indicated generally by a bus 24.

Inputs to the I/O 22 include an engine speed signal (rpm) provided by an engine driven distributor 26 which generates pulse signals at a frequency of the engine cylinder intake events and therefore having a frequency varying with engine speed, a manifold absolute pressure signal (P) from a conventional pressure sensor, a throttle position sensor signal (TP) from a conventional position sensor, an engine temperature signal (TEMP) provided from a conventional temperature sensor and a service request signal that may take the form of a signal provided by a service technician by grounding an input to the I/O 22. An idle air drive signal is provided to the motor controller when the engine is operated at idle for positioning the idle bypass passage valve in accord with sensed engine speed to control the air bypassed around the main throttle so as to establish a predetermined engine idle speed. Timed injector drive signals having durations calculated to provide a predetermined desired air/fuel ratio are provided to the fuel injector positioned in the throttle body 12. During predetermined engine operating conditions, the air and fuel are supplied at a ratio determined in accord with this invention to establish the desired CO content in the exhaust gases discharged into the atmosphere.

In general, the digital computer illustrated in FIG. 1 executes an operating program permanently stored in the ROM 18. Data is temporarily stored and retrieved from various ROM designated address locations in the RAM 20. Discrete input signals are sensed and the values of analog signals are determined via the input/output circuit 22 (typically including an analog-to-digital converter) which receives the rpm signal from the distributor 26, the temperature, pressure and throttle position signals TEMP, P and TP, the service request signal and also a voltage from the vehicle battery.

Figure 2:
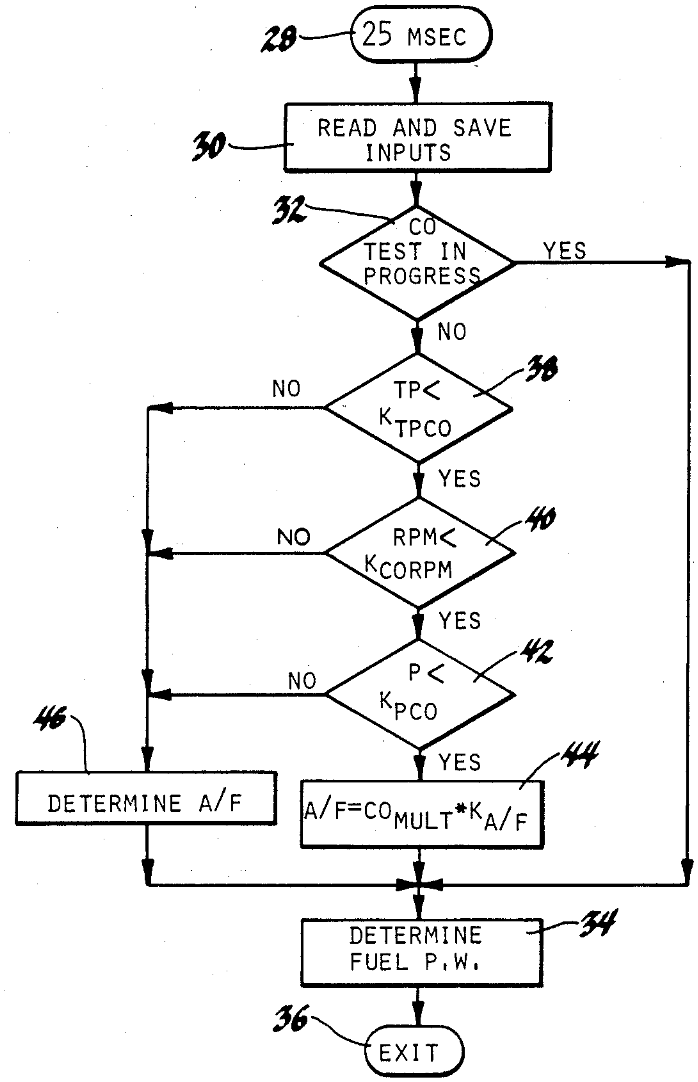
FIGS. 2 thru 6 are computer flow diagrams illustrating the operation of the system of FIG. 1 in accord with the principles of this invention.

The digital computer of FIG. 1 executes various routines at various internally timed interrupt intervals. One such routine is a 25 millisecond interrupt routine executed at 25 millisecond intervals and which is generally illustrated in FIG. 2. Referring to FIG. 2, the 25 millisecond interrupt routine is entered at point 28 and proceeds to a point 30 where the various input signals to the input/output circuit 22 are read and saved at specified RAM memory locations. Thereafter, the program proceeds to a point 32 where the computer samples the state of an idle CO test in progress flag to determine whether or not a CO test is in progress.

The CO test functions to determine the air and fuel mixture to be supplied to the engine 10 to achieve a desired CO content in the exhaust gases in accord with the principles of this invention. This test will be described in detail in conjunction with FIGS. 4 through 6.

If the CO test is in progress as represented by the flag being set, the program determines at step 34 the fuel pulse width to be issued to the fuel injector once for each engine cylinder intake event for injecting fuel into the engine 10. The duration of the fuel pulse width is based on the mass air flow into the engine determined from the manifold absolute pressure signal P and the engine speed signal rpm and a desired air/fuel ratio. This pulse is issued to the injector from the I/O once for each intake event (represented by the rpm signals from the distributor 26) in the internal combustion engine 10. From step 34, the program exits the routine at step 36.

Returning to step 32, if the CO test in progres flag is reset indicating the CO test is not in progress, the program proceeds to determine via a series of steps 38, 40 and 42 whether or not the engine is operating at an operating point or within an operating range where the CO content of the exhaust gases is to be established at the desired level. For example, the steps 38 through 42 may determine whether or not the engine is in an idle state or, in another embodiment, whether or not the engine is in an idle or cruise mode state. Accordingly, step 38 compares the throttle position with the constant $K_{TPCO}$. If the throttle position is less than the constant $K_{TPCO}$, the program proceeds to the step 40 where the engine speed is compared with a constant $K_{CORPM}$. If the engine speed is less than this constant, the program then proceeds to the step 42 to determine if the manifold pressure P is less than a constant $K_{PCO}$. If all three of these conditions are met, the program proceeds to a step 44 where the air/fuel ratio is set equal to a constant ratio $K_{A/F}$, such as the stoichiometric ratio, times a multiplier $CO_{MULT}$ that is determined in accord with the principles of this invention and which establishes an air/fuel ratio determined to produce the desired CO content in the exhaust gases discharged from the engine 10. From step 44, the program then proceeds to the step 34 where the fuel pulse width is determined based on the air flow into the engine and the air/fuel ratio established at step 44. The resulting fuel metered to the engine 10 establishes the air/fuel ratio at which the CO content of the exhaust gases is at the desired value.

If any of the steps 38 through 42 indicate the conditions do not exist for operating the engine at the air/fuel ratio establishing the desired CO output of the engine, the program proceeds to a step 46 wherein the air/fuel ratio is established based on the engine operating condition. For example, the air/fuel ratio may be established at a rich ratio for power enrichment at this step. From step 46, the program proceeds to the step 34 where the fuel pulse width to establish the air/fuel ratio specified at step 46 is determined.

Figure 3:
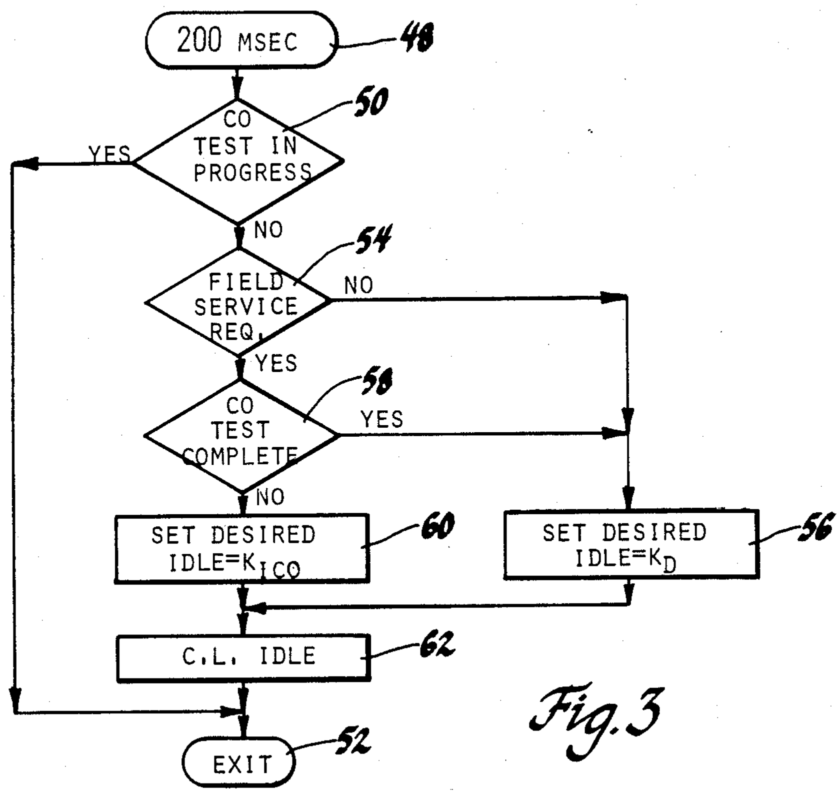

Referring to FIG. 3, there is illustrated a 200 millisecond interrupt routine that is executed at 200 millisecond intervals by the digital computer of FIG. 1. This program is entered at point 48 and proceeds to a step 50 where it determines whether or not the CO test is in progress in the same manner as in step 32. If the test is in progress, the program then exits the routine at step 52. However, if the CO test is not in progress, the program proceeds to a step 54 where it determines whether or not there has been a field service request indicating a command to conduct a CO test to recalibrate the engine to determine the value of the air/fuel ratio producing the desired CO level in the exhaust gases. This field service request may be provided during a final vehicle checkout and thereafter by a technician at periodic service intervals of the vehicle. The service request is inputted to the computer by the technician after the engine has been started and while it is operating at idle.

If the field service request is not sensed, the program proceeds to a step 56 where the idle speed is set to a desired value $K_D$ may be dependent upon factors including engine temperature and load. However, if the field service request is sensed, the program proceeds to a step 58 where it determines whether or not the CO test has been completed represented by the state of a CO test complete flag. If complete (flag set), the program proceeds to the step 56 but if incomplete (flag reset), the program proceeds to a step 60 where the desired idle speed is set to a constant $K_{ICO}$ representing the initial idle speed for the CO test.

From step 56 or 60, the program proceeds to a step 62 where a closed loop idle routine is executed for adjusting the motor controlled valve in the idle air bypass passage previously described for maintaining the desired idle speed established at step 56 or 60. The routine of step 62 is a conventional closed loop idle speed controller that first determines if the conditions (such as closed throttle, etc.) for idle speed control exist. If the conditions exist for closed loop idle speed adjustment, the routine of step 62 adjusts the engine speed by adjusting the air through the bypass passage in a direction to cause correspondence between the actual engine speed and the desired idle speed. From step 62, the program exits the routine at step 52.

It should be noted that the conditions set by steps 38, 40 and 42 of FIG. 2 in order for the air/fuel ratio to be set by step 44 encompass the conditions for idle speed control by the closed loop idle speed control routine 62 so that the air/fuel ratio of the mixture supplied to the engine 10 while the idle speed is being controlled is equal to the multiplier $CO_{mult}$ times the constant $K_{A/F}$. Also, it is to be noted that the closed loop idle routine 62 is bypassed while the idle CO test is in progress by proceeding directly from step 50 to the exit point 52. As will be described, the idle CO test will be initiated in response to the field service request and when the idle speed has been controlled by the closed loop idle routine 62 to the desired idle speed $K_{ICO}$ established at step 60.

Figure 6:
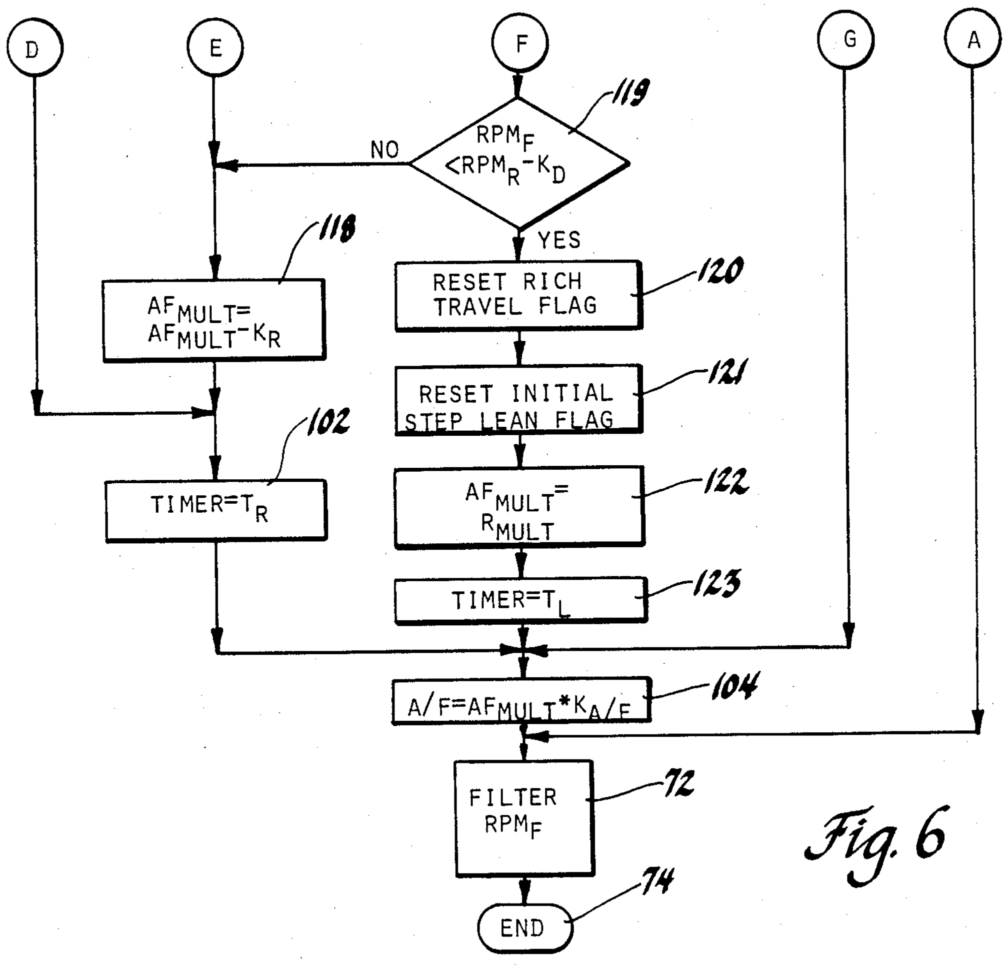
Figure 4:
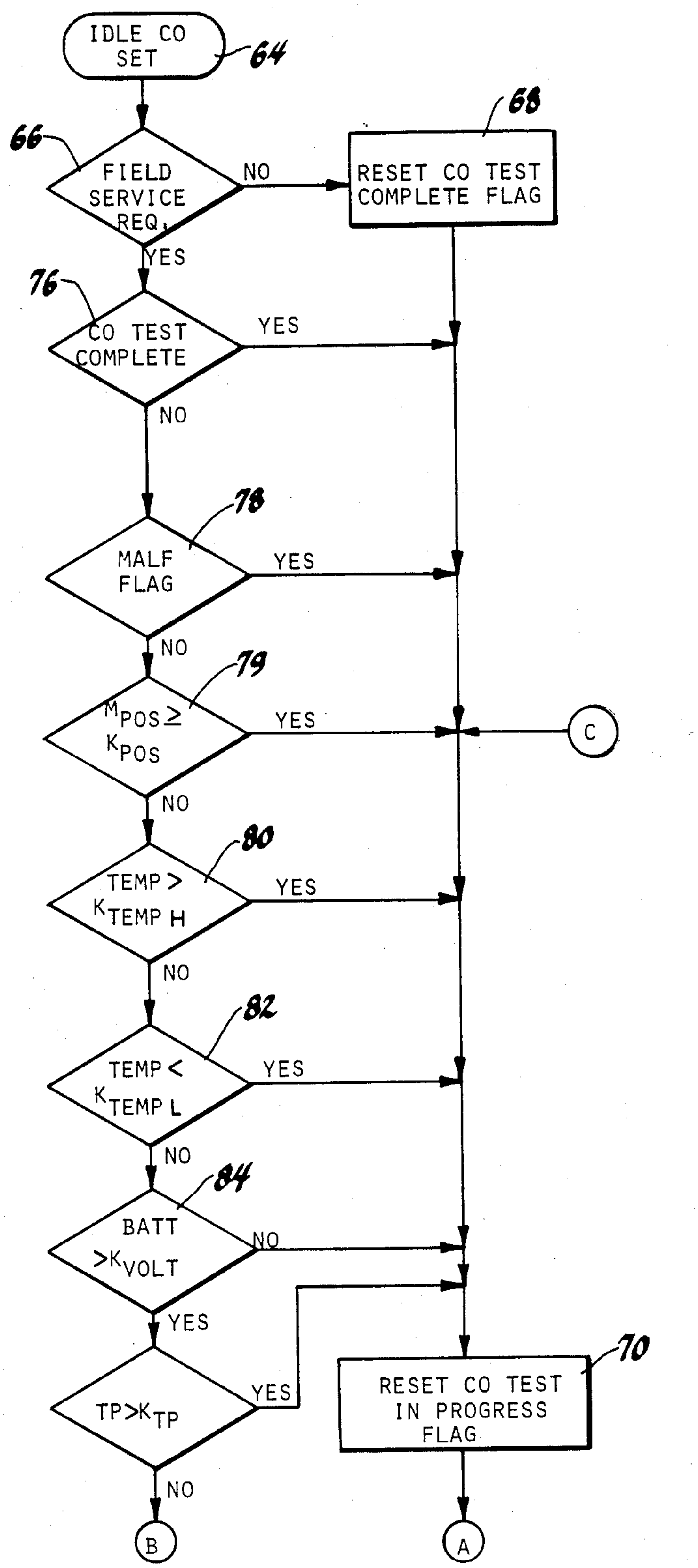
Figure 5:
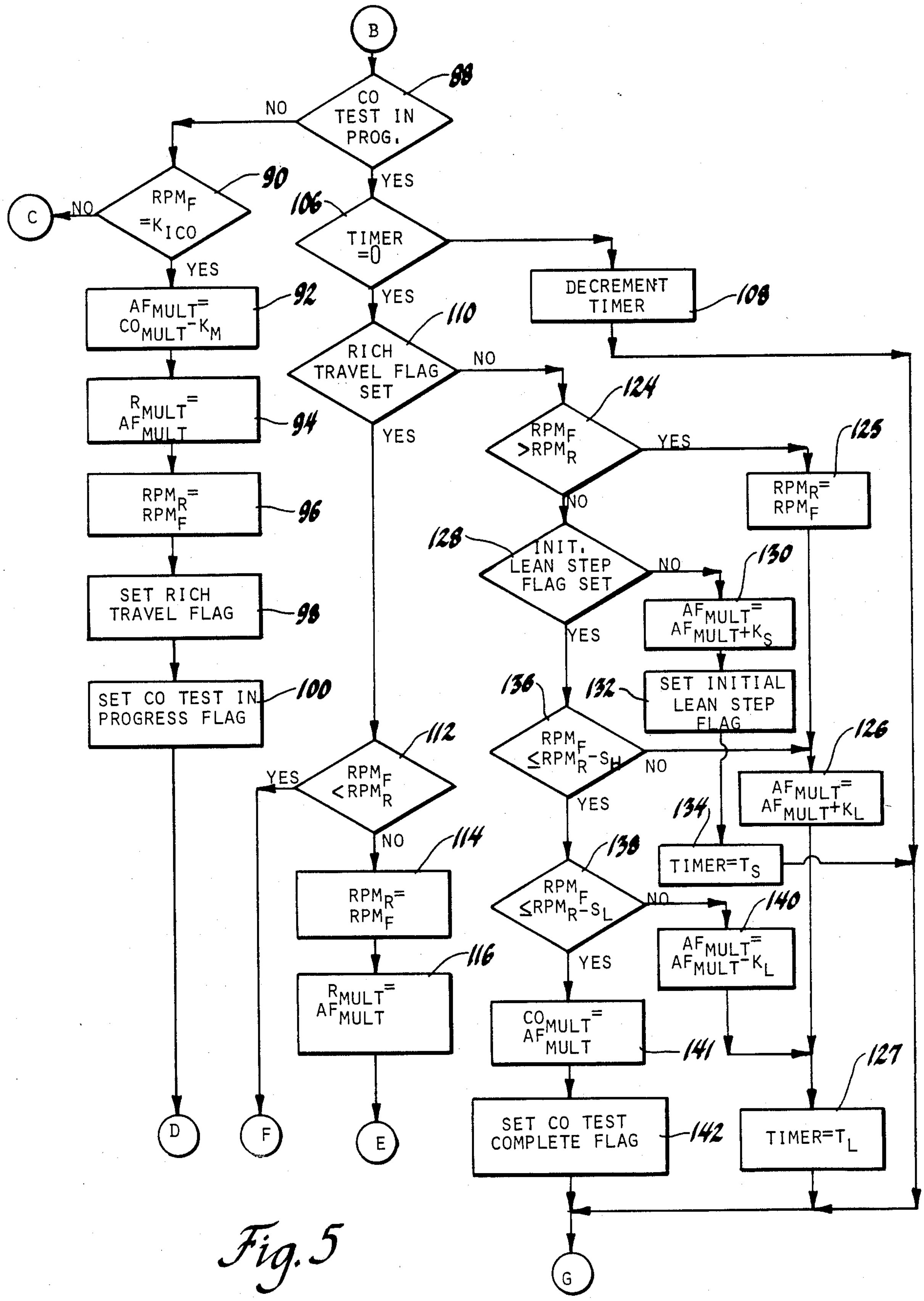

Referring to FIGS. 4, 5 and 6, there is illustrated an idle CO set routine that is executed at 500 millisecond intervals by the digital computer of FIG. 1. This routine is entered at point 64 and proceeds to a step 66 where the routine determines whether or not there is a field service request which represents a command for the system to recalibrate the value of the air/fuel ratio establishing the desired CO level in the exhaust gases.

If service request has not been made, the program proceeds from step 66 to a step 68 where the idle CO test complete flag is reset. Thereafter, the program proceeds to a step 70 where the idle CO test in progress flag is reset and then to a step 72 where a filtered value of engine speed $RPM_F$ is updated based on the last sensed engine speed saved at step 30. Thereafter, the idle CO set routine ends at step 74.

Returning again to step 66, if a service request is sensed, the program proceeds to a step 76 where the program samples the idle CO test complete flag. If the idle CO test is complete (flag set), the program proceeds to the step 70 where the idle CO test in progress flag is reset. However, if the idle CO test has not been completed (flag reset), the program proceeds to determine whether predetermined criteria exist for executing the idle CO test.

The criteria include (A) whether or not a malfunction flag determined by a diagnostics routine not illustrated is set indicating a system malfunction (step 78), (B) whether or not the idle speed motor position $M_{POS}$ is greater or equal to than a constant $K_{POS}$ which represents a value above which an abnormal idle condition exists (step 79), (C) whether or not the engine temperature is within a window established by the calibration constants $K_{TEMPH}$ and $K_{TEMPL}$ (steps 80 and 82), (D) whether or not the battery voltage is greater than a calibration constant $K_{VOLT}$ indicating a high load condition (step 84) and (E) whether or not the throttle position is greater than a calibration constant $K_{TP}$ indicating a substantially closed throttle as required for the engine to be in an idle mode.

If any of the steps 78 thru 86 indicate a condition does not exist for executing the idle CO test, the program proceeds to the step 70 where the idle CO test in progress flag is reset. If all of the criteria of steps 76 thru 86 are met for executing the idle CO test, the program proceeds to a step 88 where it determines whether or not the idle CO test in progress flag is set indicating CO test in progress. If the test is not yet in progress (flag reset), the program proceeds to a step 90 where it determines whether or not the filtered engine speed $RPM_F$ determined at step 72 is equal to the idle speed $K_{ICO}$ set at step 60 of FIG. 3. As previously indicated with respect to FIG. 3, the desired idle speed was set to the value $K_{ICO}$ when a field service request was sensed at step 54. If the closed loop idle routine of FIG. 3 has not yet stabilized the idle speed at the value $K_{ICO}$, the program proceeds from the step 90 to the step 70 where the idle CO test in progress flag is cleared.

The foregoing steps 64 through 90 are continuously repeated at 500 millisecond intervals until such time that it senses that the closed loop idle routine 62 has stabilized the idle speed such that the filtered engine speed $RPM_F$ is equal to the constant $K_{ICO}$. When this condition is sensed, the program proceeds from the step 90 to the step 92 where an air/fuel ratio multiplier value $AF_{MULT}$ is set equal to the current value of the multiplier $CO_{MULT}$ previously described with respect to step 44 and previously determined to establish the air/fuel ratio resulting in the desired CO level in the exhaust gases minus a constant $K_M$ (to cause a rich shift in the air/fuel ratio). Thereafter at step 94, a reference multiplier $R_{MULT}$ is set equal to the $AF_{MULT}$ established at step 92.

At step 96, a reference engine speed $RPM_R$ is set equal to the filtered engine speed $RPM_F$. Next at step 98, a rich travel flag is set to condition the routine to step the air/fuel ratio of the mixture supplied to the engine 10 in a rich direction. Thereafter at step 100, the idle CO test in progress flag is set and at step 102 a timer register in the RAM is set equal to the time $T_R$, the value $T_R$ representing a time period for allowing the engine to stabilize after a step in the air/fuel ratio of the mixture supplied thereto in the rich direction.

From step 102, the program proceeds to a step 104 where the air/fuel ratio of the mixture to be supplied to the engine is set equal to the product of the air/fuel multiplier $AF_{MULT}$ established at step 92 and the constant $K_{A/F}$. The program then proceeds to step 72 where the engine speed value is filtered as previously described. Thereafter at step 34 of FIG. 2, as long as the CO test in progress flag is set, the fuel pulse width is determined based on the air/fuel ratio set at step 104 based on the value of the multiplier $AF_{MULT}$.

In the manner to be described, during then next repeated executions of the idle CO set routine, the air/fuel ratio of the mixture supplied to the engine is stepped in the rich direction with a stabilization period between steps as long as the engine speed increases with the changes in the air/fuel ratio.

When the idle CO set routine is next repeated, the program proceeds from step 88 to a step 106 where the value in the timer is compared to zero. It will be recalled that this time was set to time $T_R$ during the prior execution of the routine at step 102. Since the time contained in the timer is not equal to zero, the program proceeds to a step 108 where the timer is decremented after which the program proceeds to the step 104 previously described. The foregoing steps are repeated until the time $T_R$ has been timed out. This time allows for the engine speed to stabilize after the setting of the air/fuel multiplier $AF_{MULT}$ at step 92.

When the timer has been decremented to zero, the program then proceeds from step 106 to a step 110 where the condition of the rich travel flag is sensed. Since this flag was set at step 98, the program proceeds to a step 112 where the filtered engine speed value $RPM_F$ is compared with the reference value $RPM_R$ to determined the nature of the change in the engine idle speed in response to the change in the air/fuel ratio in the rich direction. If the engine speed increased as a result of the step of the air/fuel ratio in the rich direction established by the constant $K_M$ of step 92, the program proceeds to a step 114 where the reference engine speed $RPM_R$ is again set equal to the filtered engine speed $RPM_F$. The reference engine speed stored at step 114 therefore becomes the highest engine idle speed sensed as the air/fuel ratio is stepped in the rich direction. The program then proceeds to a step 116 where the reference multiplier $R_{MULT}$ is set equal to the air/fuel multiplier $AF_{MULTI}$. The value of reference multiplier $R_{MULT}$ then becomes the multiplier establishing the air/fuel ratio resulting in the stored peak idle speed $RPM_R$. At step 118, the air/fuel multiplier $AF_{MULT}$ is again decreased by a value $K_R$ to effect another rich step in the air/fuel ratio of the mixture supplied to the engine. Thereafter, the timer is again set to the value $T_R$ at step 102 and at step 104, the air/fuel ratio to be used at step 34 of FIG. 2 is determined based on the new value of the air/fuel multiplier $AF_{MULT}$ set at step 118.

In the foregoing manner, upon repeated executions of the idle CO set routine, the air/fuel ratio established at step 104 is periodically decreased until such time that a decrease in the air/fuel ratio of the mixture supplied to the engine results in a decrease in engine speed as sensed at step 112. This indicates that the engine idle speed has reached a peak value as a function of the air/fuel ratio of the mixture supplied to the engine and is now decreasing as the air/fuel ratio is stepped in the rich direction. When this condition is sensed at step 112, a step 119 is executed where the program determines whether or not the engine idle speed has decreased from the peak idle speed (the current stored value of $RPM_R$ ) by a predetermined amount $K_C$ to ensure that a peak idle speed has been reached.

If the engine speed has not decreased by at least an amount $K_D$, the program proceeds to the step 118 where the air/fuel ratio is again stepped in the rich direction by decreasing the air/fuel multiplier $AF_{MULTI}$. When the engine speed decreases by the amount $K_D$ from the stored peak value $RPM_R$ as a result of further decreases in the air/fuel ratio of the mixture supplied to the engine 10, the program proceeds from the step 119 to the step 120 where the rich travel flag is reset to end the adjustment of the air/fuel ratio in the rich direction and then to step 121 where an initial step lean flag is reset to condition the routine to provide an initial lean step in the air/fuel ratio. Thereafter at step 122, the air/fuel multiplier $AF_{MULT}$ is returned to the stored value of the reference multiplier $R_{MULT}$ (the multiplier that established the air/fuel ratio resulting in the peak idle speed $RPM_R$ ).

At step 123, the timing register is set to a time $T_L$ representing a stabilization time functioning in a similar manner to the time $T_R$ previously utilized when the air/fuel ratio was stepped in the rich direction. Following step 123, the program proceeds to the step 104 where the air/fuel ratio is returned to the air/fuel ratio based on the value of $AF_{MULT}$ set at step 122 and which produced the maximum engine idle speed.

During the following execution of the idle CO set routine, the program first times the period $T_L$ via the steps 106 and 108 after which the program proceeds from the step 110 to a step 124 (the rich travel flag having been previously reset at step 120). At step 124, the filtered engine speed $RPM_F$ is compared with the last stored value of the reference engine speed $RPM_R$ and therefore the peak engine idle speed as a function of air/fuel ratio. If $RPM_F$ is greater than the previous peak idle speed value, the program proceeds to a step 125 where the reference engine speed $RPM_R$ is updated to the newly detected peak engine idle speed. Thereafter, the program proceeds to a step 126 where the air/fuel multiplier $AF_{MULT}$ is increased by a step $K_L$ representing a step of the air/fuel ratio in the lean direction. Then at step 127, the timer is again set to $T_L$. From step 127, the program proceeds to the step 104 where the air/fuel ratio to be utilized at step 44 of FIG. 2 is adjusted in the lean direction as determined by the multiplier $AF_{MULT}$ set at step 126.

Again, the program times the period $T_L$ via the step 106 and 108 to allow the engine speed to stabilize. When the period $T_L$ is timed out, the program proceeds from step 106 to 110 and then to 124. If the filtered engine speed $RPM_F$ is still greater than the reference speed $RPM_R$ indicating the engine speed increasing, the foregoing steps 125, 126 and 127 are repeated as previously described. However, if the engine speed is now less than the reference speed $RPM_R$, the program proceeds to a step 128 where the condition of the initial lean step flag is sensed. If reset indicating the initial lean step has not yet been taken, the program proceeds to a step 130 where the air/fuel multiplier $AF_{MULT}$ is increased by the value $K_S$ to cause an initial large lean step in the air/fuel ratio. The purpose of this large step is to shorten the idle CO test.

From step 130 the program proceeds to step 132 where the initial lean step flag is set. Thereafter at step 134, the program sets the timer to a value $T_S$ to establish a time for the engine speed to stabilize. From step 134 the program proceeds to step 104 where the air/fuel ratio of the mixture to be delivered to the engine is adjusted in accord with the air/fuel multiplier $AF_{MULT}$ established at step 130.

The idle CO set routine next functions as will be described to adjust the air/fuel ratio in the lean direction while monitoring the engine idle speed until the engine idle speed decreases from the peak idle speed $RPM_R$ by a predetermined value that is a constant or, as in the present embodiment, that is within a predetermined band defined by the values $S_H$ and $S_L$. This decrease in engine idle speed was previously determined by engine testing to be the decrease corresponding to the desired CO level in the exhaust gases discharged from the engine 10. The relationship of this predetermined drop in engine idle speed from the peak value as the air fuel/ratio is increased to the desired CO level corresponding thereto is substantially constant and does not vary substantially with the engine over time.

When the program next returns to step 128, it proceeds to step 136 to determine whether the engine speed has decreased from the peak value $RPM_R$ by an amount equal to $S_H$. If the engine speed $RPM_F$ has not decreased from the peak speed by the amount $S_H$, the program proceeds to the step 126 where the air/fuel multiplier $AF_{MULT}$ is again increased by the value $K_L$ to affect a step increase in the air/fuel ratio of the mixture delivered to the engine 10 as previously described and the timer is again set to the time $T_L$ at step 127. As the foregoing steps are repeated to step the air/fuel ratio in the lean direction, the engine idle speed decreased until is becomes less than the peak value $RPM_R$ by the amount $S_H$. When this is detected at step 136, the program next determines at step 138 if the speed drop was excessive thereby taking it out of the window boundary defined by the value $S_L$. If the idle speed drop was excessive, the program functions via step 140 to step the air/fuel ratio in the rich direction to cause an increase in the idle speed.

After the idle CO set routine has adjusted the air/fuel ratio of the mixture supplied to the engine 10 to a ratio producing the idle speed decrease from the stored peak value $RPM_R$ as defined by the band limits $S_H$ and $S_L$, the value of the multiplier $AF_{MULT}$ establishing that air/fuel ratio becomes the new open loop calibration for establishing the desired CO output of the engine 10. Accordingly, at step 141, the CO multiplier $CO_{MULT}$ to be used at step 44 to achieve the desired CO output is set equal to the air/fuel multiplier $AF_{MULT}$ determined to produce that CO output. Thereafter at step 142 the idle CO test complete flag is set to indicate completion of the idle CO test. Upon each subsequent execution of the idle CO set routine of FIGS. 4 through 6, the program proceeds from step 66 to steps 68, 70 72 and 74 as previously described.

During the following executions of the 25 millisecond routine of FIG. 2, whenever the engine operating condition is such that the engine operates in the region defined by the criteria of steps 38, 40 and 42, the program proceeds to step 44 where the air/fuel ratio of the mixture to be delivered to the engine 10 is established by the multiplier $CO_{MULT}$ determined as previously described to produce the desired CO level in the engine exhaust gases. The fuel pulse width is then determined at step 34 based on this air/fuel ratio and the engine mass air flow.

While the foregoing description of a preferred embodiment is described with respect to establishing an engine calibration to produce the desired CO output, it is understood that the foregoing procedure can be utilized to establish a predetermined engine air/fuel ratio. In that case, the value of $S_H$ and $S_L$ and steps 136 and 138 will be determined by testing and represents the speed drop from the maximum engine idle speed achieved by variation of the air/fuel ratio that corresponds to the desired air/fuel ratio. The multiplier established is then utilized in the open loop determination of the fuel pulse width at step 34 of FIG. 2.

The foregoing description of a preferred embodiment for the purposes of illustrating the invention is not to be considered as limiting or restricting the invention since many modifications may be made by the exercise of skill in the art without departing from the scope of the invention.

I claim:

1. The method of calibrating an air-fuel delivery system supplying a mixture of air and fuel to an internal combustion engine comprising:

establishing an initial open loop calibration of the air-fuel delivery system including the steps of (A) operating the engine at idle, (B) determining the peak engine idle speed as a function of the air/fuel ratio of the mixture supplied to the engine, (C) adjusting the air/fuel ratio of the mixture supplied to the engine until a desired engine operating condition is established and (D) storing the values of the air/fuel ratio and the decrease in the engine idle speed from the determined peak engine idle speed when the engine operating condition is established at the desired condition and periodically recalibrating the air-fuel delivery system including the steps of (A) operating the engine at idle, (B) determining the peak engine idle speed as a function of the air/fuel ratio of the mixture supplied to the engine, (C) adjusting the air/fuel ratio of the mixture supplied to the engine until the engine idle speed decreases from the peak engine idle speed by the stored decrease in the engine idle speed and (D) updating the stored value of the air/fuel ratio to the value at which the engine idle speed has decreased from the peak engine idle speed by the stored decrease, the stored value of the air/fuel ratio comprising a calibration value for the air-fuel delivery system to establish the desired engine operating condition.

* * * * *